Nov. 15, 1960   E. R. ZIEGLER   2,959,803
WINDSHIELD CLEANING SYSTEM

Filed Jan. 10, 1958   3 Sheets-Sheet 1

INVENTOR.
Eugene R. Ziegler
BY
*M. H. Strickland*
HIS ATTORNEY

INVENTOR.
Eugene R. Ziegler
BY
A. H. Strickland
HIS ATTORNEY

Nov. 15, 1960   E. R. ZIEGLER   2,959,803
WINDSHIELD CLEANING SYSTEM
Filed Jan. 10, 1958   3 Sheets-Sheet 3

INVENTOR.
Eugene R. Ziegler
BY
*J. H. Strickland*
HIS ATTORNEY

# United States Patent Office 2,959,803
Patented Nov. 15, 1960

2,959,803

WINDSHIELD CLEANING SYSTEM

Eugene R. Ziegler, Spencerport, N.Y., assignor to General Motors Corporation, Detroit, Mich., a corporation of Delaware Filed Jan. 10, 1958, Ser. No. 708,103

20 Claims. (Cl. 15—250.02)

This invention pertains to a windshield cleaning system, and particularly to a system including a wiper unit and a washer unit which can be operated conjointly, the washer unit being operative to discharge liquid solvent onto a windshield in timed relation with movement of the wiper blades thereacross.

In my copending application Serial No. 708,240, filed of even date herewith, now Patent No. 2,936,476, a cleaning system is disclosed including a wiper unit and a washer unit operable from a single motor wherein the washer unit is operative to discharge liquid solvent onto the windshield prior to operation of the wiper unit. In my copending application Serial No. 708,197, filed of even date herewith, now Patent No. 2,925,618, a windshield cleaning system is disclosed wherein the washer unit and the wiper unit are operated by a single motor together with means for automatically effecting a second automatic cleaning cycle upon actuation of the washer unit control after the washer unit has been arrested during the first automatic cleaning cycle. The present invention relates to a cleaning system wherein the washer unit and the wiper unit are operated by a single motor so constructed and arranged that liquid solvent will be discharged onto the windshield simultaneously with operation of the wiper unit and including means for instantaneously restarting the cleaning cycle at any time during the period of conjoint operation. The structural embodiment of the washer unit is similar to that disclosed in my copending application Serial No. 708,239, filed of even date herewith, inasmuch as it includes Geneva motion stroke counting means.

Accordingly, among my objects are the provision of a cleaning system including a washer unit and a wiper unit including means for activating the wiper unit simultaneously with activation of the washer unit; the further provision of a cleaning system including a washer unit and a wiper unit having means for effecting conjoint operation of both units for an automatic cleaning cycle and means for restarting the cycle at any time during the automatic cleaning cycle; and the still further provision of a washer unit and a wiper unit operable by a single motor including programing means having an interruptible, intermittent driving connection for movement in one direction and resilient means for moving the programing means in the opposite direction.

The aforementioned and other objects are accomplished in the present invention by embodying a program disc which is biased in one direction by a torsion spring and movable in the opposite direction through a Geneva motion. Specifically, the wiper unit may be of the type disclosed in copending application Serial No. 686,432 filed September 26, 1957, in the name of Harry W. Schmitz et al. and assigned to the assignee of this invention. Thus, the wiper unit includes a unidirectional electric motor having a continuous driving connection with a crank assembly. The crank assembly has a running orbit wherein the wiper blades are oscillated throughout a running stroke, the inboard stroke end being above the cowl of the vehicle. The crank assembly also has a parking orbit wherein the wiper blades are oscillated throughout the same amplitude, but the inboard stroke end is against the cowl of the vehicle.

The washer unit includes an intermittent squirt type pump having an interruptible driving connection with the wiper motor. The pump comprises a rubber, or rubberlike bulb for pumping liquid solvent from a reservoir and discharging it onto the winshield in timed relation with the stroking movement of the wiper blades thereacross. The pump includes a reciprocable rod having oppositely extending cam followers. One of the followers is engageable with a two-lobe cam, or eccentric, having a continuous driving connection with the wiper motor.

The other cam follower is engageable with a lockout cam formed on the program disc. The eccentric also carries a drive pin for a Geneva wheel that is clutchable to a pinion gear, the pinion gear having toothed engagement with the program disc. The driving connection between the pinion gear and the Geneva wheel can be established by energization of an electromagnet.

The program disc is formed with a toothed periphery having a pitch diameter twice the pitch diameter of the pinion gear, such that a complete revolution of the pinion gear effects a one-half revolution of the program disc. In addition, the program disc is formed with a flange having an arcuate cut out and a face cam which extends throughout an angle of 265°. When the program disc is in the "off" position the pinion gear is aligned with the cut out in the flange so as to prevent rotation of the program disc by a torsion spring which is wound up when the pinion gear drives the program disc. The pinion gear is normally disengaged from the Geneva wheel by means of a spring.

The face cam on the program disc controls a speed switch for the wiper motor, and when the pinion gear is actuated by the electromagnet and thereafter maintained in driving engagement with the Geneva wheel by the flange on the program disc, a switch, controlled by the position of the pinion gear, for energizing the wiper motor remains closed. Upon energization of the electromagnet, the pinion gear is disengaged from the cut out on the program disc permitting the torsion spring to turn the program disc backwards throughout an angle of 330° until the edge surface of the lockout cam engages the lug on the pump rod. Since the wiper unit is always arrested with the worm gear in a predetermined position, and since the pump eccentric is driven directly from the worm gear, the eccentric has a dwell aligned with the pump rod follower in the "off" position of the program disc so that upon reverse rotation of the program disc the pump will complete a delivery stroke to discharge liquid solvent onto the windshield. The discharge of liquid solvent onto the windshield occurs simultaneously with energization of the wiper motor caused by movement of the pinion gear.

The speed switch controlled by the face cam on the program disc will connect the motor for high speed operation, and the driving pin on the eccentric will impart intermittent movement of the Geneva wheel. Since the driving pin on the eccentric has left the Geneva wheel when the wiper unit is started from the parked position, the eccentric will have to make almost a complete revolution before it engages a slot in the Geneva wheel.

The automatic cleaning cycle comprises a predetermined number of squirts of liquid solvent as determined by the arcuate extend of the lockout cam. A complete revolution of the eccentric effects two delivery strokes of the washer pump, and in the embodiment disclosed effects a 72° movement of the Geneva wheel. A 72° movement of the Geneva wheel and the pinion gear will effect a 36° movement of the program disc towards its "off" position, and thus it will require approximately nine revolutions of the eccentric to return the program disc to its "off" position. The Geneva wheel constitutes a stroke counting means, and after a predetermined number of wiper strokes the pump is automatically arrested by reengagement of the pump rod lug follower with the lockout cam. At the same time, the speed of the wiper motor is reduced and during a second predetermined number of wiper strokes the wiper unit alone is operative to dry the windshield.

At any time during the automatic cleaning cycle, the electromagnet can be reenergized by the operator so as to permit the torsion spring to return the program disc to its starting position. When the program disc finally arrives at its "off" position, the pinion gear will move into the cut out portion thereby declutching itself from the Geneva wheel and preventing rotation of the program disc by the torsion spring. In addition, this movement of the pinion gear will open the running circuit to the motor so that the motor will automatically be arrested when the wiper blades arrive in the parked position.

Further objects and advantages of the present invention will be apparent from the following descripion, reference being had to the accompanying drawings, wherein a preferred embodiment of the present invention is clearly shown.

Figure 1:
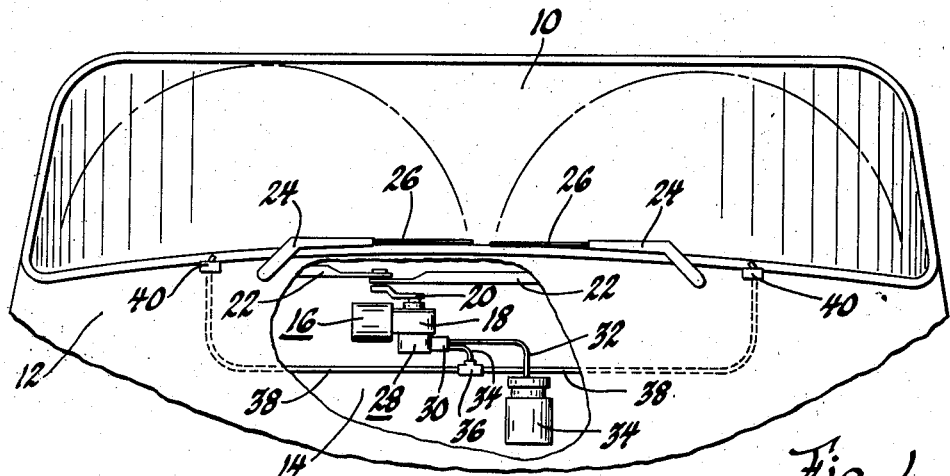
Figure 1 is a fragmentary view, with certain parts broken away, of a vehicle equipped with the windshield cleaning system of this invention.

With particular reference to Figure 1, a vehicle is shown having a windshield 10, a cowl 12 and a firewall 14. The vehicle includes a wiper unit comprising a unidirectional electric motor 16 connected to a gear reduction unit 18 having a continuous driving connection with a crank assembly 20. The inner ends of drive links 22 are rotatably connected to the crank assembly, the other end of the drive links being operatively connected to spaced pivot shafts, not shown, which carry wiper arms 24. The wiper arms carry wiper blades 26 which are oscillatable over asymmetrical paths across the outer surface of the windshield 10.

The wiper unit is of the type disclosed in the aforementioned copending application Serial No. 686,432, and thus the crank assembly 20 has a running orbit wherein the wiper blades 26 are oscillated throughout a running stroke, the inboard end of which is above the cowl 12 of the vehicle. The crank assembly is also operable in a parking orbit wherein the inboard stroke end is against the cowl of the vehicle, and when the wiper blades reach the depressed parked position, as shown in Figure 1, the wiper motor 16 will be automatically deenergized, as will be pointed out more particularly hereinafter.

The windshield cleaning system also includes a washer unit comprising a pump and control assembly housing 28 attached to the gear reduction housing and including a pump which is connected through a check valve assembly 30 to an intake hose 32. Intake hose 32 communicates with a reservoir 34 for liquid solvent. The check valve 30 also connects with an outlet conduit 34 and a T-coupling 36 to which delivery hoses 38 are connected. The other ends of the delivery hoses 38 connect with spaced nozzles 40 through which liquid solvent can be discharged onto the windshield 10 into the paths of the wiper blades 26 and in timed relation with movement thereof across the windshield 10.

With particular reference to Figures 2 through 9, the pump and control assembly is disposed within the housing 28 and includes a pump comprising an elastomeric bulb, or bellows, 42 having an open end, not shown, connecting with the check valve assembly 30. The closed end of the bulb 42 is formed with a depression 44 which receives the enlarged end 46 of a reciprocable pump rod 48. The pump rod 48 is connected to the bulb 42 by a pair of washers 50 and 52 which embrace a lip 54 that partially overhangs the depression 44. The washer 52 also constitutes a spring retainer for one end of a compression spring 56, the other end of the spring 56 engaging another spring retainer, not shown, that abuts the housing 28. The spring 56 acts constantly on the bulb 42, and as will be pointed out hereinafter is operative to collapse the bulb 42 so as to effect the delivery stroke of the pump.

Figure 3:
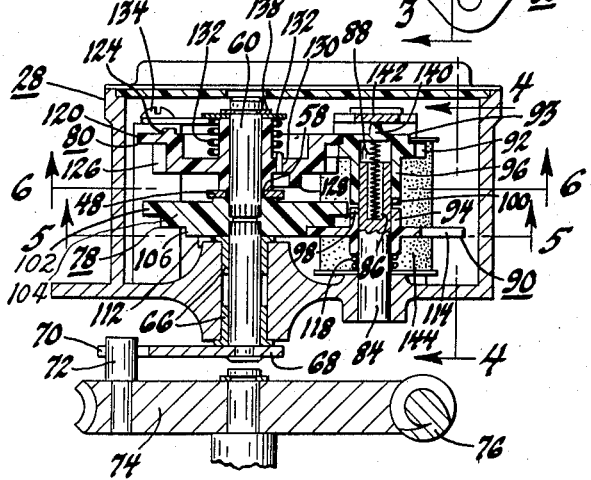
Figure 3 is a fragmentary sectional view taken along line 3—3 of Figure 2.
Figure 6:
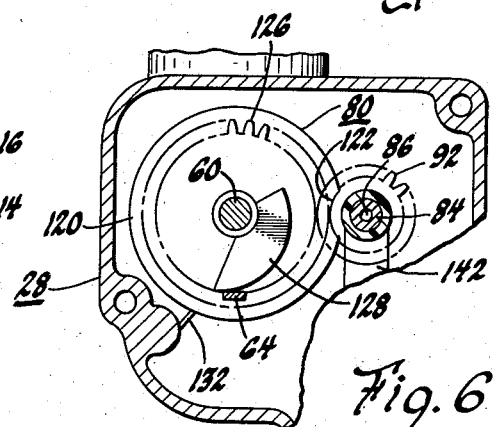
Figure 7:
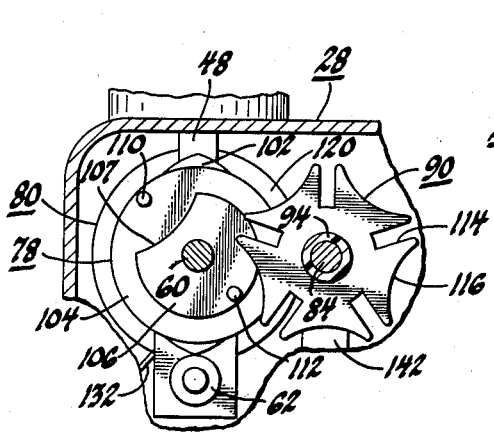
Figure 7 is a fragmentary view similar to Figure 5 depicting the Geneva wheel disengaged from its driver.
Figure 8:
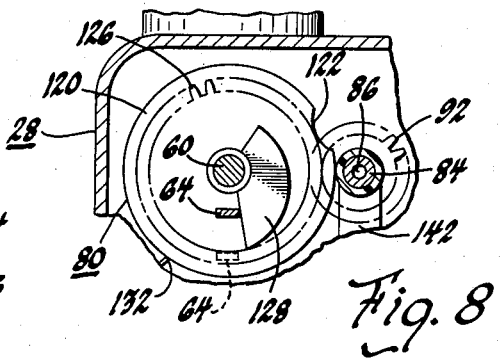
Figure 8 is a view similar to Figure 6 with the program disc at its starting position.
Figure 9:
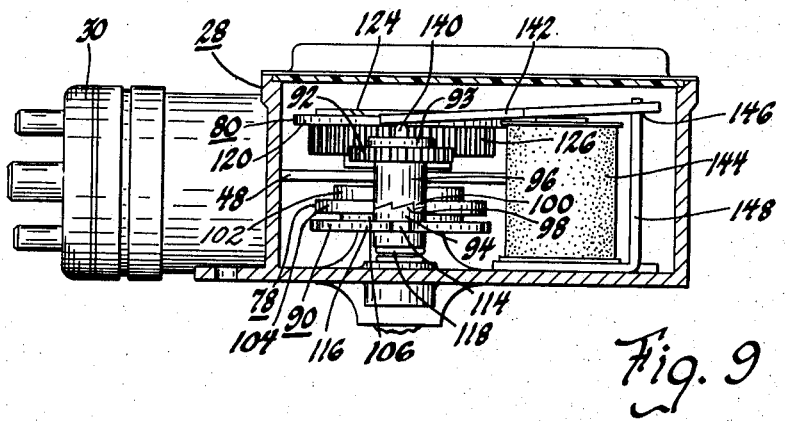
Figure 9 is a fragmentary view similar to Figure 4 with the electromagnet energized and the Geneva wheel disengaged from its driving means.

The pump rod 48 extends through an opening in the side wall of the housing 28 and, as shown in Figure 3, has an elongate longitudinal slot 58 through which a shaft 60 extends. The elongate slot 58 permits the pump rod 48 to reciprocate relative to the shaft 60. The other end of the rod 48 has a roller type cam follower 62 attached thereto, and in addition, the pump rod 48 has an upstanding lug type follower 64 upstanding therefrom, as shown in Figures 6 and 8, the followers 62 and 64 extending in opposite direction.

The shaft 60 is rotatably journalled in the housing 28 by sleeve bearings 66. The outer end of the shaft 60 has a crank arm 68 rigidly secured thereto having a slotted end as indicated by numeral 70. The slotted end 70 receives a crank pin 72 attached to a worm gear 74, the worm gear being driven by a worm 76 formed on the armature shaft of the motor 16. The worm gear 74 has a continuous driving connection with the crank assembly 20, as is shown in the aforementioned copending application Serial No. 686,432. A Geneva wheel drive disc 78 is drivingly connected to the shaft 60, and a programing disc 80 is rotatably journalled on the shaft 60. The discs 78 and 80 are maintained in spaced coaxial relationship by rod 48.

Figure 4:
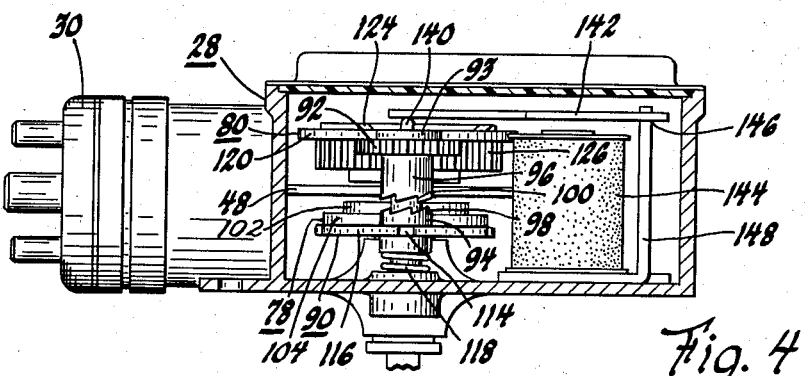
Figures 4, 5 and 6 are fragmentary sectional views taken along lines 4—4, 5—5, 6—6 respectively, of Figure 3.

A stub shaft 84 is fixedly mounted in the housing 28, the stub shaft 84 being spaced from but parallel to the shaft 60. The stub shaft 84 is formed with a recess 86 within which a spring 88 is disposed. In addition, a Geneva wheel 90 is rotatably journalled on the stub shaft 84, as is a pinion gear 92. The Geneva wheel 90 and the pinion gear 92 have axially extending sleeves 94 and 96 respectively formed with dog toothed clutch surfaces 98 and 100, respectively as shown in Figure 4. The dog toothed clutch surfaces 98 and 100 are normally maintained out of engagement by the spring 88, one end of which engages the bottom of the recess 86 in the shaft 84, and the other end of which engages the pinion gear 92.

Figure 5:
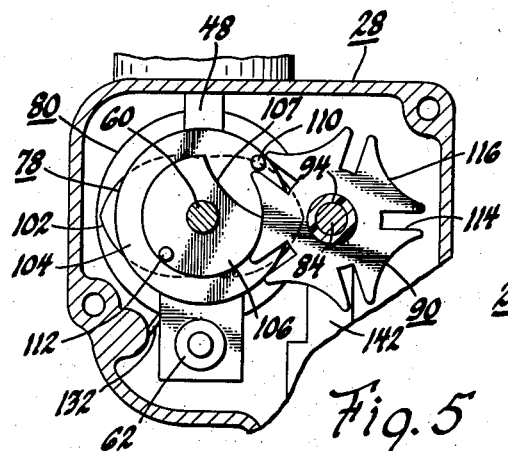

As seen in Figure 5, the disc 78 has a two-lobe cam 102 formed on one side thereof, an intermediate circular flange 104 and a hub 106 having an arcuate cut out 107 on the other side thereof. A Geneva wheel driving pin 110 protrudes outwardly, as viewed in Figure 5, from the flange 104, and the hub portion 106 has an upstanding Geneva wheel locating pin 112. The spring 56 is operative, under certain conditions, to maintain the roller-type follower 62 of the pump rod 48 in engagement with the cam 102 so that rotation of the disc 78 will impart reciprocation to the pump rod 48.

It will be apparent that since the disc 78 is driven directly from the worm gear 74, as is the crank assembly 20, reciprocation of the pump rod 48 will be in timed relation with the stroking movement, or oscillation of the wiper blades. Moreover, since a complete revolution of the worm gear 74 effects a complete revolution of the disc 78, and since the wiper blades complete an inboard and an outboard stroke during each revolution of the worm gear 74, the pump will complete two intake strokes and two delivery strokes during each revolution of the worm gear 74 and the disc 78 when the driving connection between the pump rod and the cam 102 is established. In addition, during each revolution of the disc 78, in the counterclockwise direction as viewed in Figure 5, a 72° movement in the counterclockwise direction will be imparted to the Geneva wheel 90.

The Geneva wheel 90 is formed with five slotted teeth 114, the teeth being interconnected by concave surfaces 116 which normally coact with the convex arcuate portion of hub 106 to prevent rotation of the Geneva wheel 90 at all times except when the driving pin 110 moves into one of the notched teeth during each revolution of the disc 78. As seen in Figure 3, the Geneva wheel 90 is maintained in resilient engagement with the flange 104 by a compression spring 118.

Figure 2:
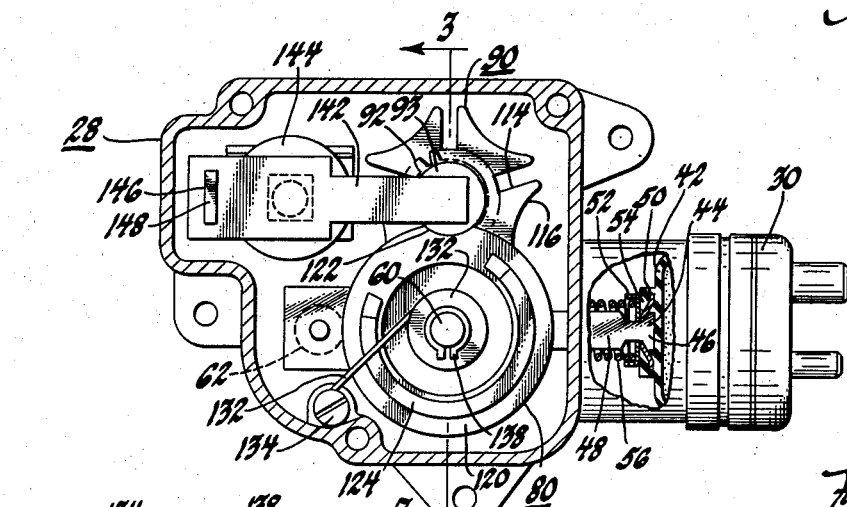
Figure 2 is a view, partly in section and partly in elevation, of the washer pump and control mechanism.

The program disc 80 as seen in Figures 2 and 6 is formed with an intermediate circular flange 120 having an arcuate cut out 122, an upstanding face cam 124 on one side thereof, a toothed peripheral portion 126 and a lockout cam 128 on one side thereof which subtends an angle of approximately 120°. In addition, the disc 80 is formed with a hole 130 within which one end of a torsion spring 132 is disposed. The torsion spring encircles the hub portion of the disc, and the other end thereof is secured to the housing 28 by a screw 134. The torsion spring is wound up in a manner tending to rotate the program disc 80 in the counterclockwise direction as viewed in Figure 2. The torsion spring 132 is retained in axial position relative to the disc 80 by a washer 132 and a snap ring 138, the snap ring engaging a groove in the shaft 60.

The pinion gear 92 meshes at all times with the teeth 126 on the program disc 80. In the "off" position of the program disc 80, the pinion gear is aligned with the arcuate cut out 122, and consequently the spring 88 can move the pinion gear 92 axially upward, as viewed in Figure 3, until the protruding end 140 engages the armature 142 of an electromagnet 144. In the upward position of the pinion gear 92, the dog toothed clutch members 98 and 100 are disengaged, as seen in Figures 3 and 4. The lockout cam 128 coacts with the lug follower 64 on the pump rod, as seen in Figure 6, to interrupt the driving connection between the roller follower 62 and the cam 102. In other words, when the lug follower 64 engages the lockout cam 128 the pump will be arrested, since the spring 56 cannot move the rod 48 so as to collapse the bulb 50. Moreover, it is pointed out that the pump is always arrested with the bulb 42 full of liquid solvent, or charged, as seen in Figure 4.

The armature 142 is pivotally mounted at 146 to the frame 148 of the electromagnet 144. When the electromagnet 144 is energized, the pinion gear 92 is moved downwardly, as viewed in Figure 4, and when the clutch member 100 engages the clutch member 98 the Geneva wheel 90 is likewise moved downwardly as viewed in Figure 4. The pinion gear 92 and the Geneva wheel 90 are moved downwardly from the position of Figure 4 to the position of Figure 9. With the Geneva wheel in the position of Figure 9, the driving connection between the disc 78 and the Geneva wheel 90 is interrupted, since the driving pin 110 does not project sufficiently to engage the slotted teeth 114 when the Geneva wheel 90 is below the surface of the hub 106. However, the locating pin 112 projects from the hub 106, and accordingly will be operative to align the Geneva wheel 90 with the convex surface of the disc 108, so that upon deenergization of the electromagnet 144 the spring 118 can move the Geneva wheel axially upwardly to the position of Figure 3.

When the electromagnet 144 is energized, the pinion gear is moved out of the arcuate cut out 122. When the hub 93 of the pinion gear 92 is disposed within the cut out 122 of the program disc 80, the hub 93 prevents rotation of the disc 80 under the urge of the torsion spring 132. Thus, when the pinion gear 92 is moved to the position of Figure 9, the torsion spring 132 rotates the program disc 80 in the counterclockwise direction as viewed in Figure 2 or the clockwise direction as viewed in Figure 6, from the position of Figure 6 to the position of Figure 8 wherein the end surface 129 of the lockout cam engages the side of the lug follower 64, these parts constituting a stop limiting movement of the disc 80 by the torsion spring 132. Thus, the torsion spring 132 is operative to rotate the disc 80 approximately 330°. With the disc 80 in the position of Figure 8, it can be seen that the flange 120 is located above the hub 93 of the pinion gear so that upon deenergization of the electromagnet 144 the pinion gear 92 will be slightly lower than the position it is shown in Figure 3, and in this position the dog toothed clutch members 98 and 100 are in engagement.

During rotation of the program disc 80 by the torsion spring 132, the lug follower 64 is disengaged from the lockout cam 128 thereby permitting the spring 56 to collapse the bulb 42 to effect a delivery stroke of the pump independently of the wiper motor 16. Upon deenergization of the electromagnet the Geneva wheel 90 will be intermittently driven by the pin 110 of the disc 78 in the counterclockwise direction as viewed in Figure 2, or in the clockwise direction as viewed in Figure 5. The disc 78 is driven in the counterclockwise direction as seen in Figure 5. Thus, the pinion gear 92 will be rotated in the counterclockwise direction as viewed in Figure 2 and impart clockwise movement to the disc 80 in a step by step manner whereupon the disc 80 will be rotated from the position of Figure 8 back to the position of Figure 6. Since the Geneva wheel 90 rotates throughout 72° during each revolution of the worm gear 74 and the disc 78, the Geneva wheel constitutes a stroke counting means. The Geneva wheel will have to complete nine steps of 72° each before the disc 80 will arrive at its starting position wherein the hub 93 of the pinion gear is aligned with the cut out 122 enabling the spring 88 to move the pinion gear upwardly thereby disengaging the clutch members 98 and 100 and restraining rotation of the disc 80 by the torsion spring 132. Rotation of the disc 80 from the position of Figure 8 to the position of Figure 6 will thus require eighteen single wiper strokes, and since the lockout cam 128 subtends an angle of approximately 120°, the lug 64 will be reengaged with the lockout cam after the disc 80 has been rotated from its starting position throughout an angle of 210°. When the lug 64 reengages the lockout cam, the washer unit is automatically arrested. Thus, the washer unit will be operative for approximately twelve wiper strokes, and during the remaining six wiper strokes the wiper unit alone will be operative, this period constituting a drying cycle.

Figure 10:
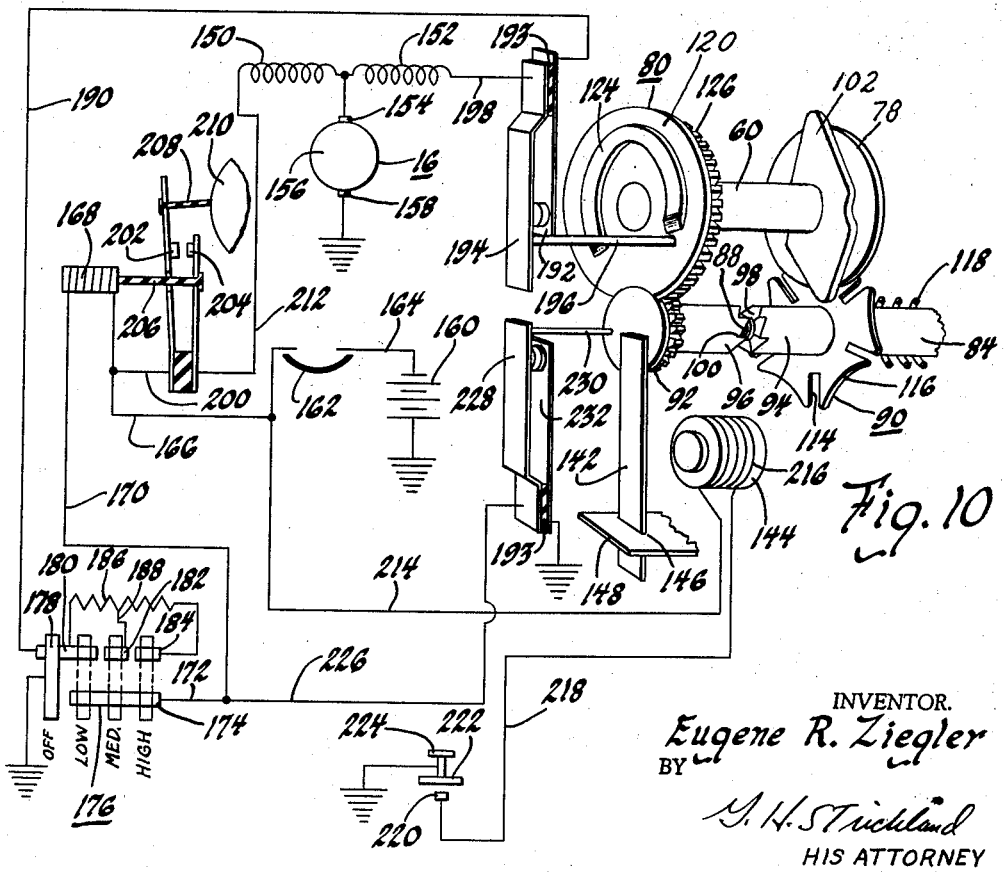
Figure 10 is a combined electrical schematic and diagrammatic view illustrating the circuits for energizing the wiper unit alone or energizing the wiper unit and the washer unit for a cycle of conjoint operation.

With particular reference to Figure 10, the motor 16 is of the compound wound type and thus includes a series field winding 150, a shunt field winding 152, the inner ends of which are interconnected. The inner ends of the two field windings are connected to a commutator brush 154 which is electrically connected to an armature 156, the other commutator brush 158 being connected to ground. The motor 16 can be energized from a battery 160, one terminal of which is connected to ground, and the other terminal of which is connected through a thermal overload switch 162 through a wire 164. The wire 164 connects with a wire 166 which is connected to relay coil 168. The other end of the relay coil is connected to a wire 170 which connects with a wire 172. Wire 172 is connected to a stationary switch contact 174 of a manually operable wiper unit control switch 176.

The wiper unit control switch 176 includes a movable bridging contact 178 which is connected to ground, as well as stationary contacts 180, 182 and 184. Contacts 180 and 184 are interconnected by a speed controlling resistor 186, having a center tap 188 connected to the contact 182. In addition, contact 180 is connected to a wire 190 which connects with a switch contact 192. Switch contact 192 is carried by an insulating switch plate 193 which is disposed above the disc 80 and pinion gear 92, as shown in Figure 3. The switch contact 192 is engageable with a switch contact 194 having a follower 196 engageable with the face cam 124 of the disc 80. The contact 194 is connected to a wire 198 and the other end of the shunt field winding 152.

The wire 166 is also connected to a wire 200 which connects with a switch contact 202. Switch contact 202 is engageable with switch contact 204, the contact 204 being connected to a plunger 206 actuated by the relay coil 168. The contact 202 carries a follower 208 engageable with a cam 210. The cam 210 is only engageable with the follower 208 when the crank assembly 20 operates in its parking orbit, and the blades arrive at the depressed parked position, as shown in Figure 1. Irrespective of whether the follower 208 engages the cam 210, or not, upon energization of coil 168, the contact 204 will be moved into engagement with the contact 202. The contact 204 is connected to a wire 212 and the other side of the series field winding 150.

The wire 164 is also connected to a wire 214 which is connected to one end of the coil 216 of the electromagnet 144. The other end of the coil 216 is connected to a wire 218 which is connected to a stationary switch contact 220. The switch contact 220 is engageable with a movable switch contact 222 that is connected to ground, the contact 222 being operable by a push button 224 which is resiliently biased to the open position. In addition, the wire 170 is connected to a wire 226, the wire 226 being connected to switch contact 228 having a follower 230 engageable with the hub 93 of the pinion gear 92. The contact 228 is engageable with a contact 232, likewise affixed to the insulating switch plate 193. The contact 232 is connected to ground.

Operation of the wiper unit alone is controlled by the switch 176. When the bridging contact 178 is moved from the "off" position to the low speed position, contacts 180 and 174 are connected to ground. Accordingly, the relay coil 168 will be energized from the battery through overload switch 162, wires 164 and 166, the coil 168, wires 170 and 172 and switch contacts 174 and 178. Thus, contact 204 will be moved into engagement with contact 202 to energize the motor 16. The motor will be energized from the battery through overload switch 162, wires 164, 166 and 200, contacts 202 and 204, wire 212 and series field winding 150. The shunt field winding 152 will likewise be energized from the series field winding through wire 198 contacts 194 and 192, wire 190 and switch contacts 180 and 178. As the shunt field winding is fully energized the motor rotates at low speed. When the bridging contact 178 is moved to the medium speed position, one-half of the resistor 186 is connected in series to the shunt field winding to reduce the energization thereof and thus increase motor speed. When the bridging contact is moved to the high speed position, the entire resistor 186 is connected in series with the shunt field winding to further increase motor speed.

When the bridging contact 178 is moved from any of the "on" positions to the "off" position, the relay coil 168 will be deenergized. However, the motor 16 will remain energized since switch contacts 202 and 204 are in engagement. The crank assembly will now move into its parking orbit and when the blades arrive at the depressed parked position the cam 210 will engage the follower 208 to separate the contacts 202 and 204 and deenergize the motor.

To initiate a cycle of conjoint operation of the washer and wiper unit, the push button 224 is depressed thereby energizing the relay 216 of the electromagnet from the battery through the overload switch 162, the wire 164, the wire 214, the coil 216, the wire 218 and switch contacts 220 and 222. Energization of the electromagnet 144 will move the armature 142 from the position of Figure 4 to the position of Figure 9 thereby disengaging the hub 93 of the pinion gear 92 and the cut out 122 in the disc 80 permitting the torsion spring 132 to unwind and rotate the disc 80 from the position of Figure 6 to the position of Figure 8, which is the starting position of the program disc 80. At the same time the Geneva wheel 90 is disengaged from the locking portion on cam disc 87 by compressing the spring 118. Movement of the pinion gear 92 by the armature 142 will also effect engagement of switch contacts 228 and 232 so as to energize the relay coil 168 and thereby energize the motor 16. Thus, the spring 56 will compress the bulb 42 to deliver a charge of liquid solvent onto the windshield simultaneously with energization of the wiper motor 16. Upon energization of the wiper motor and the worm gear 74 will rotate as will the disc 78. The electromagnet only has to be momentarily energized, since after the torsion spring rotates the disc 80, the flange 120 prevents the hub 93 of the pinion gear 92 from reengaging the arcuate cut out 122. Consequently, upon deenergization of the electromagnet, the clutch members 98 and 100 will assume driving engagement, and the locating pin 112 will realign the Geneva wheel 90 if required so that the spring 118 can move the Geneva wheel into engagement with the flange 104. Thus, the Geneva wheel 90 will have imparted thereto intermittent rotary movement since the pin 110 engages a slotted tooth 144 during each revolution of the disc 78. The cycle of conjoint operation will continue until the program disc has been rotated to the "off" position, as shown in Figures 2 and 6. Moreover, during the first twelve wiper strokes, liquid solvent will be intermittently discharged by the washer unit, after which the washer unit will be automatically arrested and during the remaining six wiper strokes the windshield will be dried. In addition, the face cam 124 will engage the follower 196 and thereby move contact 194 out of engagement with contact 192 during the period of time that the washer unit is operative. Thus, when the washer unit is operative the motor 16 will be operated at high speed, since the shunt field winding 152 is open circuited. When the lug 64 reengages the lockout cam 128 the follower 196 will be disengaged from the face cam 124 thereby permitting contact 192 to engage contact 194 to fully deenergize the shunt field winding so that the motor will rotate at low speed.

If the washer unit control button 224 is only closed to initiate one cycle of conjoint operation of the wiper unit and the washer unit, it is apparent that the washer unit and the wiper unit will be arrested in sequential order that prolongs wiper unit operation for a predetermined number of wiper strokes after the washer unit has been arrested. However, if the button 224 is momentarily depressed at any time prior to completion of the first cycle of conjoint operation, the pinion gear 92 and the Geneva wheel 90 will be moved to the position of Figure 9, permitting the torsion spring 132 to return the program disc 80 to its starting position, as shown in Figure 8. Thus, the system can be recycled at any time and the program disc 80 will return to its initial starting position under the urge of the torsion spring 132. If the button 224 is held in the depressed position, both the washer unit and the wiper unit will be operative since the Geneva wheel 90 will be disconnected from its driving disc 78. Under these conditions, the Geneva motion stroke counting means will not be actuated to count the strokes for an automatic conjoint cycle of operation until the electromagnet is deenergized by releasing the push button 224.

When the program disc 80 is returned to its off position, as seen in Figures 2 and 6, after an automatic cycle of conjoint operation, the hub 93 of the pinion gear 92 will be aligned with the cut out 122 so that the spring 88 will reposition the hub within the cut out thereby restraining rotation of the disc 80 under the urge of the torsion spring 132. In addition, dog toothed clutch members 98 and 100 will be disengaged so that the pinion gear will not be driven by the Geneva wheel 90. In addition, upward movement of the pinion gear 92 will actuate the follower 230 to move contact 228 out of engagement with contact 232 thereby deenergizing the relay coil 168 so as to permit the crank assembly 20 to move into the parking orbit, and when the blades arrive at the depressed parked position the cam 210 will move contact 202 out of engagement with contact 204 to deenergize the motor 16.

From the foregoing it is apparent that the present invention provides a unique arrangement for actuating a wiper unit and a washer unit from a single motor together with means for actuating the wiper unit to deliver a charge of liquid solvent onto the windshield independently of the motor and energize the motor simultaneously with the discharge of liquid solvent onto the windshield. In addition, the system can be recycled at any time during a cycle of conjoint operation, and such recycling will cause the system to return to its starting position.

While the embodiment of the invention as herein disclosed constitutes a preferred form, it is to be understood that other forms might be adopted.

What is claimed is as follows:

1. A windshield cleaning system including, a wiper unit, a washer unit, means to simultaneously set both units in operation for a cycle of conjoint operation, and stroke counting means operable to automatically arrest the two units in sequential order that prolongs wiper unit operation for a predetermined number of wiper unit strokes after operation of the washer unit has been arrested, said system being characterized in that subsequent actuation of the first recited means at any time prior to automatic arresting of the wiper unit will effect a recycling of the conjoint operation from its starting position.

2. A windshield cleaning system including, a wiper unit, a washer unit, means to simultaneously set both units in operation for conjoint operation, and stroke counting means operable to continue operation of said washer unit for a predetermined number of strokes of said wiper unit and then automatically arrest said washer unit, said system being characterized in that actuation of said first recited means at any time during the cycle of conjoint operation will recycle said system from its starting position.

3. A windshield cleaning system including, a wiper unit, a washer unit, means operable to simultaneously actuate said washer unit to deliver liquid solvent and activate said wiper unit to set both units in operation for conjoint operation, and stroke counting means operable to continue operation of the washer unit for a predetermined number of strokes of said wiper unit and then automatically arrest said washer unit.

4. A windshield cleaning system including, a wiper unit, a washer unit, means operable to simultaneously actuate said washer unit to deliver liquid solvent and activate said wiper unit to set both units in operation for conjoint operation, and stroke counting means operable to arrest the two units in sequential order that prolongs wiper unit operation for a predetermined number of wiper unit strokes after operation of the washer unit has been arrested.

5. A windshield cleaning system including, a wiper unit, a washer unit, means operative to simultaneously actuate said washer unit to deliver liquid solvent and activate said wiper unit to set both units in operation for a cycle of conjoint operation, and stroke counting means operable to continue operation of the washer unit for a predetermined number of strokes of said wiper unit and then automatically arrest said washer unit, said system being characterized in that subsequent actuation of said first recited means at any time during said cycle of conjoint operation will recycle said system from its starting position.

6. A windshield cleaning system including, a wiper unit, a washer unit, means operable to simultaneously actuate said washer unit to deliver liquid solvent and activate said wiper unit to set both units in operation for a cycle of conjoint operation, and stroke counting means operable to automatically arrest the two units in sequential order that prolongs wiper unit operation for a predetermined number of wiper unit strokes after operation of the washer unit has been arrested, said system being characterized in that subsequent actuation of said first recited means at any time during said cycle of conjoint operation recycles said system from its starting position.

7. A windshield cleaning system including, a wiper unit, a washer unit, a single motor for actuating both units, said motor having a continuous driving connection with said wiper unit and an interruptible driving connection with said washer unit, means operable independently of said motor for actuating said washer unit to deliver liquid solvent, and manually controlled means for actuating said first recited means to set both units in operation for conjoint operation by activating said motor and establishing the driving connection between said motor and said washer unit, the system being characterized in that subsequent actuation of said manually operable means during a cycle of conjoint operation recycles said system from its starting position.

8. A windshield cleaning system including, a wiper unit, a washer unit, a single motor for actuating both units, said motor having a continuous driving connection with said wiper unit and an interruptible driving connection with said washer unit, and manually controlled means to set both units in operation for a cycle of conjoint operation by energizing said motor and establishing the driving connection between said motor and said washer unit, the system being characterized in that subsequent actuation of said manually controlled means during the cycle of conjoint operation instantaneously recycles the system from its starting position.

9. A windshield cleaning system including, a wiper unit, a washer unit, a single motor for actuating both units, said motor having a continuous driving connection with said wiper unit and an interruptible driving connection with said washer unit, manually operable means to set both units in operation for a cycle of conjoint operation by activating said motor and establishing the driving connection between said motor and said washer unit, and stroke counting means actuated during said cycle of conjoint operation for continuing operation of said washer unit for a predetermined number of strokes of said wiper unit and then automatically arresting said washer unit, the system being characterized in that subsequent actuation of said manually controlled means at any time during the cycle of conjoint operation instantaneously recycles the system from its starting position.

10. The system set forth in claim 9 including means to effect actuation of said washer unit to deliver liquid solvent independently of said motor.

11. A windshield cleaning system including, a wiper unit, a washer unit having a pump, an electric motor having a continuous driving connection with said wiper unit and an interruptible driving connection with said pump, means including an electromagnet for establishing the driving connection between said motor and said pump, a circuit for energizing said motor to effect a cycle of conjoint operation of both units including switch means actuated by energization of said electromagnet, and manually operable means for controlling the energization of said electromagnet, the system being characterized in that subsequent actuation of said manually operable means during the cycle of conjoint operation instantaneously recycles the system from its starting position.

12. The system set forth in claim 11 including stroke counting means actuated during the cycle of conjoint operation for continuing operation of said washer unit for a predetermined number of strokes of said wiper unit and then automatically arresting said washer unit.

13. The system set forth in claim 11 including means operable upon energization of said electromagnet for actuating said washer unit to deliver liquid solvent independently of said motor.

14. The system set forth in claim 13 wherein said pump includes a reciprocable rod having a cam follower, and wherein said last recited means includes a cam, said cam follower being engageable with said cam, a torsion spring biasing said cam in one direction, and means actuated upon energization of said electromagnet for releasing said cam for movement by said torsion spring so as to move the cam out of engagement with said cam follower.

15. A washer pump for a vehicle windshield including, a motor, a reciprocable rod operable by the motor, a pump including a fluid displacing member having an intake stroke and a delivery stroke, said fluid displacing member being connected to said rod, resilient means engaging said rod for effecting the delivery stroke of said pump, cam means engageable with said rod for preventing reciprocation thereof, a torsion spring biasing said cam in a direction so as to permit reciprocation of said rod, and removable stop means associated with said cam for permitting movement thereof by said torsion spring.

16. The pump set forth in claim 15 wherein said cam constitutes a part of a disc having a toothed periphery and a flange with a cut out portion, and wherein the toothed periphery of said disc is engaged with an axially movable pinion gear, the said pinion gear being engageable by said cut out to prevent rotation of said disc under the urge of said torsion spring in one position thereof, said pinion gear being movable to a second position wherein it is disengaged from the cut out portion to permit rotation of said disc by said torsion spring.

17. The pump set forth in claim 16 wherein the axial position of said pinion gear is controlled by an electromagnet.

18. The pump set forth in claim 16 wherein after rotation of said disc by said torsion spring the flange retains the pinion gear in its second position, and intermittent rotary driving means engageable with said pinion gear in said second position for rotating said pinion gear and disc back to the position wherein the pinion gear is aligned with the cutout.

19. The pump set forth in claim 16 wherein said pinion gear is drivingly connected to a Geneva wheel in the second position thereof, and means driven by said motor for imparting intermittent rotary movement to said Geneva wheel.

20. The pump set forth in claim 16 wherein said pinion gear is engageable with a Geneva wheel in the second position thereof, means driven by said motor for imparting rotary motion to said Geneva wheel, and wherein the means for moving said pinion gear from the said first position to the second position comprises an electromagnet which, when energized, disengages the Geneva wheel from its driving means, said driving means having a locating pin thereon to realign the Geneva wheel upon de-energization of said electromagnet.

References Cited in the file of this patent

UNITED STATES PATENTS

| | | |
|---|---|---|
| 2,688,514 | Oishei et al. | Sept. 7, 1954 |
| 2,816,316 | Oishei | Dec. 17, 1957 |
| 2,878,505 | Ziegler | Mar. 24, 1959 |

FOREIGN PATENTS

| | | |
|---|---|---|
| 1,111,220 | France | Oct. 26, 1955 |